(12) United States Patent
Huang et al.

(10) Patent No.: US 10,907,694 B2
(45) Date of Patent: Feb. 2, 2021

(54) BAND-SAWING CHECK VALVE DEVICE

(71) Applicant: COSEN MECHATRONICS CO., LTD., Hsinchu (TW)

(72) Inventors: Mu-Shui Huang, Hsinchu (TW); Jian-Bin Zhang, Hsinchu (TW)

(73) Assignee: COSEN MECHATRONICS CO., LTD., Hsinchu (TW)

( * ) Notice: Subject to any disclaimer, the term of this patent is extended or adjusted under 35 U.S.C. 154(b) by 108 days.

(21) Appl. No.: 16/174,358

(22) Filed: Oct. 30, 2018

(65) Prior Publication Data
US 2020/0132133 A1   Apr. 30, 2020

(51) Int. Cl.
| | |
|---|---|
| *F16D 41/063* | (2006.01) |
| *F16D 41/069* | (2006.01) |
| *B23D 55/08* | (2006.01) |
| *F16D 41/064* | (2006.01) |

(52) U.S. Cl.
CPC ......... *F16D 41/064* (2013.01); *B23D 55/088* (2013.01); *F16D 41/063* (2013.01); *F16D 41/069* (2013.01)

(58) Field of Classification Search
CPC ...... F16D 41/06–41/069; B23D 55/00–55/088
See application file for complete search history.

(56) References Cited

U.S. PATENT DOCUMENTS

| | | | | |
|---|---|---|---|---|
| 4,306,478 | A | * | 12/1981 | Stolzer ................ B23D 47/10 83/464 |
| 5,063,806 | A | * | 11/1991 | Mayfield ................ B23Q 5/58 83/471.3 |
| 5,331,875 | A | * | 7/1994 | Mayfield ............. B23D 45/025 192/45.018 |
| 2004/0003976 | A1 | * | 1/2004 | Pederson ............. F16D 41/069 192/45.1 |

\* cited by examiner

*Primary Examiner* — Ernesto A Suarez
*Assistant Examiner* — Lillian T Nguyen
(74) *Attorney, Agent, or Firm* — WPAT, PC

(57) ABSTRACT

A band-sawing check valve device is provided. The band-sawing check valve device includes a main wheel, a transmission assembly, a driving assembly and a check valve assembly. The transmission assembly is linked to a transmission shaft. The transmission shaft is disposed to the transmission assembly, the driving assembly drives the transmission shaft to drive the main wheel, and the check valve assembly is used to limit the rotation of the main wheel in a single direction.

9 Claims, 4 Drawing Sheets

BAND-SAWING CHECK VALVE DEVICE

FIELD OF THE INVENTION

The present invention relates to a main wheel structure, and more particularly, to a band-sawing check valve device for preventing a main wheel from rotating in a reverse direction.

BACKGROUND OF THE INVENTION

Conventionally, a saw bow in a band saw machine is connected to a main wheel and a transmission wheel while enabling its band saw blade to be mounted by winding itself around the radially outer edges of both the main wheel and the transmission wheel, by that the rotating main wheel is able to bring along the band saw blade to move for performing a saw cutting operation. Generally, the cutting speed of a band saw blade must be regulated and adjusted according to the material characteristic of the work piece that is to be sawed in any band sawing operation. That is, a work piece that is comparatively softer can be cut in a faster cutting speed while the cutting speed for a harder work piece should be adjusted to a slower speed, so that only can the band saw blade to from breaking, but also can ensure the band saw blade to operate in a better cutting efficiency.

To achieving a power cutting operation using the aforesaid band saw machine, a flywheel effect may be induced while the main wheel is being driven to rotate for causing the main wheel to rotate in a reverse direction, or a reaction force is enabled to be generated on the blade tip in a cutting process with a high feed rate for consequently also causing the main wheel to rotate in a reverse direction. Therefore, it is in need of a band-sawing check valve device for preventing a main wheel from rotating in a reverse direction.

SUMMARY OF THE INVENTION

In view of the disadvantages of prior art, the primary object of the present invention is to provide a band-sawing check valve device with a check valve assembly that is designed to be mounted on a transmission shaft for restricting the main wheel 10 to rotate in one direction only so as to prevent the main wheel from rotating in an undesired reverse direction, and thus by the use of the band-sawing check valve device of the present invention, a power cutting operation can be achieved.

In an embodiment, the present invention provides a band-sawing check valve device, which comprises: a main wheel, a transmission assembly, a driving assembly and a check valve assembly. In this embodiment, the transmission assembly is connected to a transmission shaft and the driving assembly is also connected to the transmission shaft, while enabling the transmission shaft to be disposed passing through the check valve assembly, so that as soon as the transmission shaft is being driven to rotate by the driving assembly, the main wheel is being brought along to rotate on in one desired direction only by the restriction of the check valve assembly.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
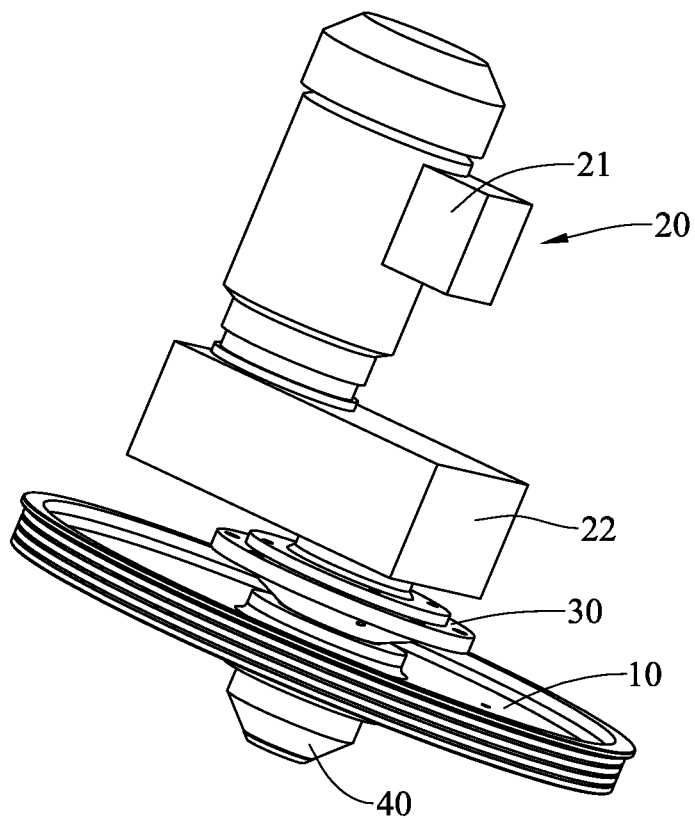
FIG. 1 is a three dimensional view of a band-sawing check valve device according to an embodiment of the present invention.
Figure 2:
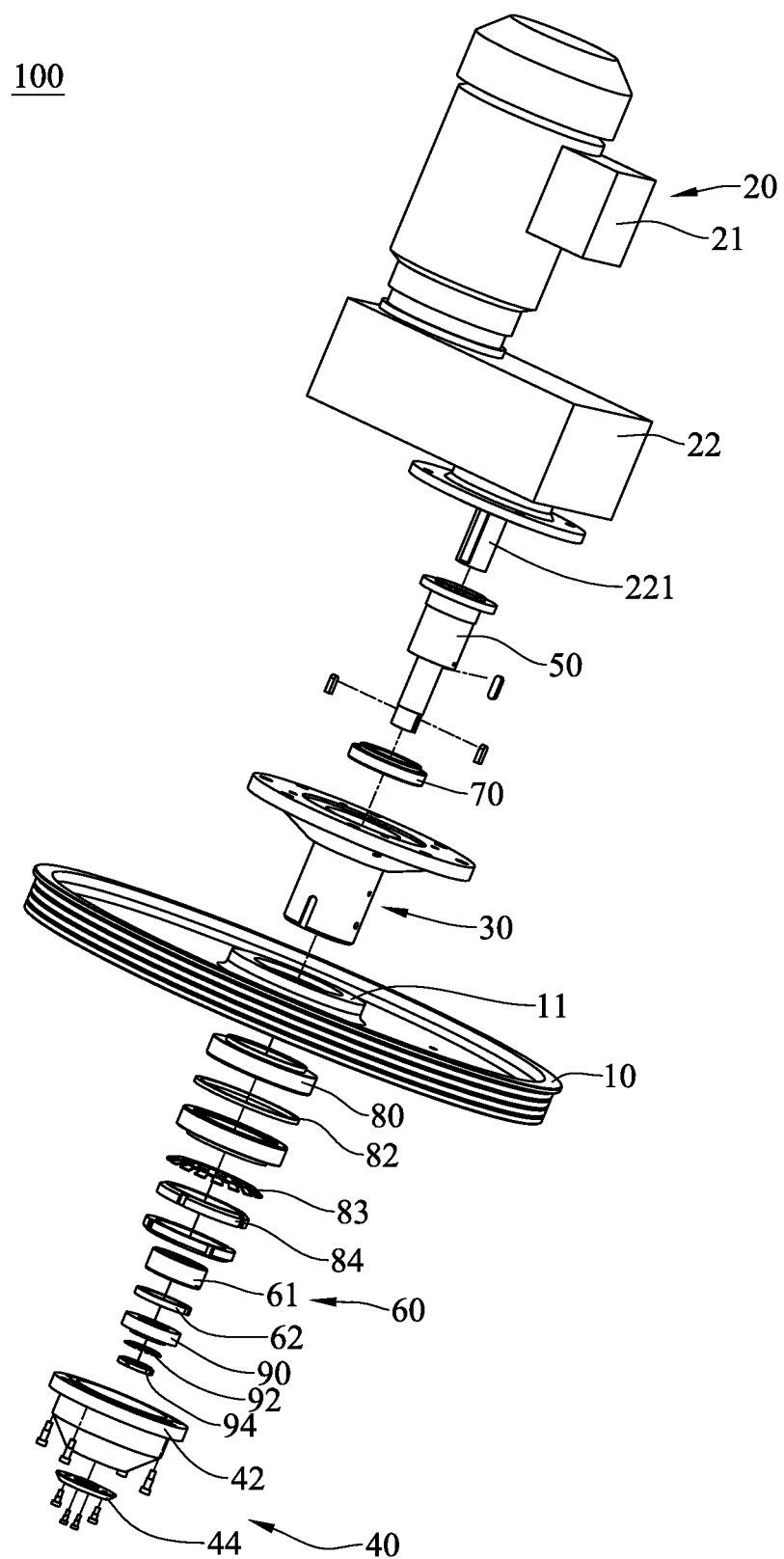
FIG. 2 is an exploded view of a band-sawing check valve device according to an embodiment of the present invention.
Figure 3:
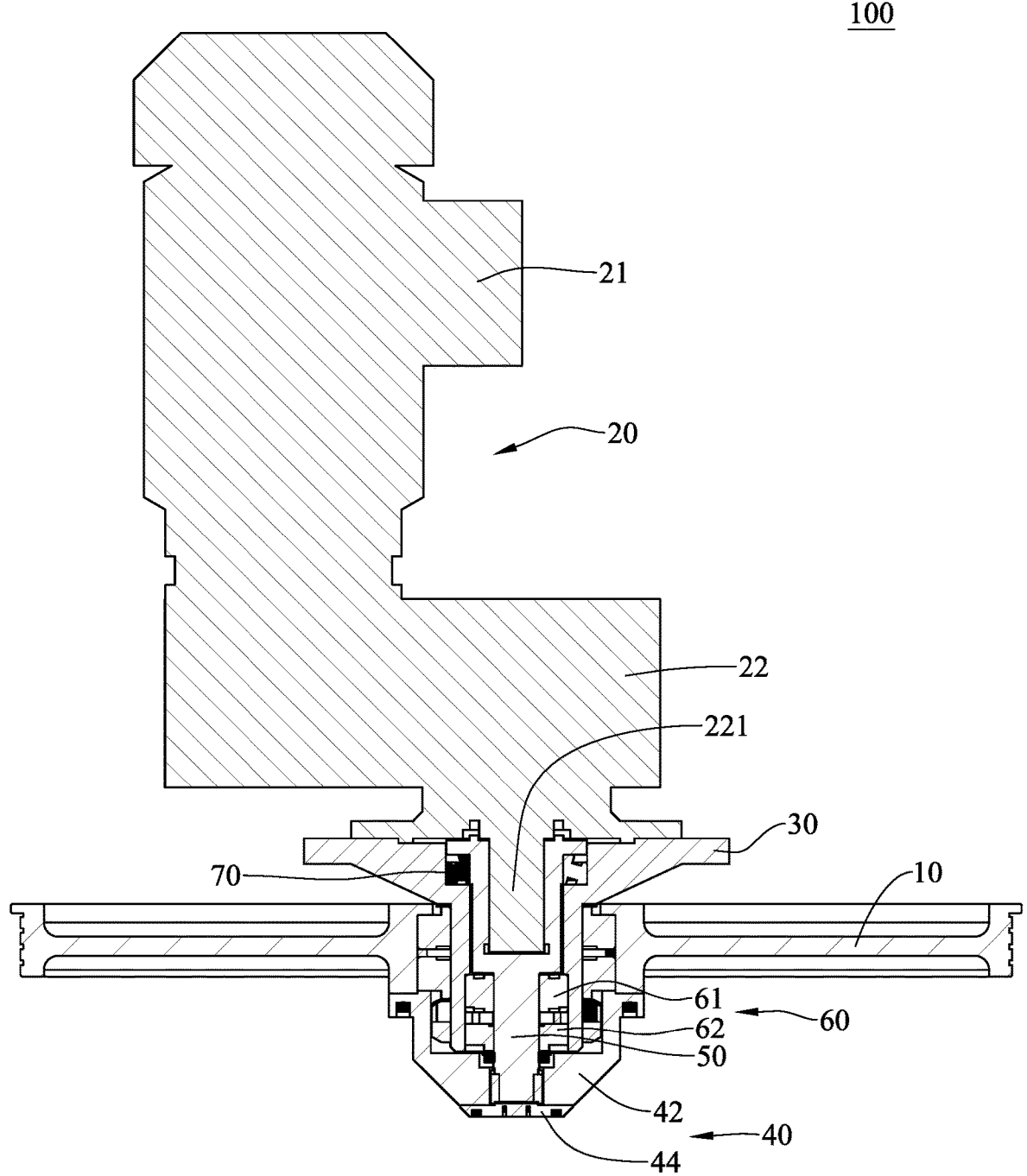
FIG. 3 is a sectional view of a band-sawing check valve device according to an embodiment of the present invention.

As shown in FIG. 1 to FIG. 3, a band-sawing check valve device of the present invention is disclosed, which comprises: a main wheel 10, a driving assembly 20, a reducer flange 30, a transmission assembly 40, a transmission shaft 50, a check valve assembly 60, a first bearing 70, a second bearing 80 and a third bearing 90.

The main wheel 10 is connected to a band saw blade and is composed of a wheel hole 11. The reducer flange 30 is disposed for allowing one end thereof to be mounted passing through the wheel hole 11 of the main wheel 10 while enabling the reducer flange 30 to be fixedly attached to a saw bow.

The driving assembly 20 is connected to the transmission shaft 50 for driving the transmission shaft 50 to move accordingly and thus bringing along the main wheel 10 to rotate. The driving assembly 20 further comprises: a reducer 22; and a motor 21, whereas the motor 21 is arranged coupled to the reducer 22. Moreover, the reducer 22 has an output shaft 221 that is disposed passing through the transmission shaft 50. In this embodiment, the transmission shaft 50 is disposed passing through the first bearing 70, the reducer flange 30, the heel hole 11, the second bearing 80, the check valve assembly 60 and the third bearing 90, by that the transmission shaft 50 is connected to the transmission assembly 40. It is noted that the first bearing 70, the second bearing 80 and the third bearing 90 can respectively be a roller bearing, but it is noted that the specification and the type of bearing to be used in the present invention can be adjusted and changed with respect to the actual machine used.

The transmission assembly 40 is connected to the main wheel 10 and also is connected to the transmission shaft 50. In this embodiment, the transmission assembly 40 further comprises a transmission disc 42 and a leak-proof seal 44, using that the leak-proof seal 44 is fixedly attached to the transmission disc 42 by using a plurality of screws, while the transmission disc 42 is connected to the transmission shaft 50.

The second bearing 80 and the third bearing 90 are disposed respectively at the two sides of the check valve assembly 60. In an embodiment of the present invention, the second bearing 80 is further connected to a main wheel bearing washer 82, a first stop ring 83 and a first fixing screw 84, in a manner that the second bearing 80 and the main wheel bearing washer 82 are connected to the main wheel 10, the reducer flange 30 has an end thereof to be disposed passing through the wheel hole 11 of the main wheel 10 while having its position to be stationed and fixed by the first stop ring 83 and the first fixing screw 84. The check valve assembly 60 is disposed fixedly inside the reducer flange 30 and further is composed of a check valve bearing 61 and a check valve bearing washer 62 in a manner that the check valve bearing 62 is mounted on the check valve bearing 61. It is noted that the check valve bearing 61 and the check valve bearing washer 62 are used for fixing the transmission shaft 50. Moreover, the third bearing 90 is further connected to a second stop ring 92 and a second fixing screw 94 so as to fix the terminal end of the transmission shaft 50. It is noted that the check valve bearing 61 can be an one-way bearing selected from the group consisting of: a roller bearing, a sprag bearing and a cam bearing. In this embodiment, the check valve bearing 61 is a roller bearing.

Using the aforesaid configuration, the transmission shaft 50 is disposed passing through the reducer flange 30, the check valve assembly 60 and then to be connected to the transmission assembly 40. Thereby, the transmission shaft 50 that is to be driven to move by the driving assembly 20 can bring along the transmission disc 42 to rotate accordingly, and the rotating transmission disc 42 enables the main wheel 10 to rotate, and then eventually the rotating main wheel 10 can enable the saw blade to move accordingly for cutting. During the process when the main wheel 10 is being driven to rotate, the check valve bearing 61 is functioned to restrict the main wheel 10 to rotate in one direction only for preventing the flywheel effect from being induced, and thus the check valve bearing 61 can restrict the main wheel 10 to rotate in one direction only so as to prevent the main wheel 10 from rotating in an undesired reverse direction, and thus a power cutting operation can be achieved.

Figure 4:
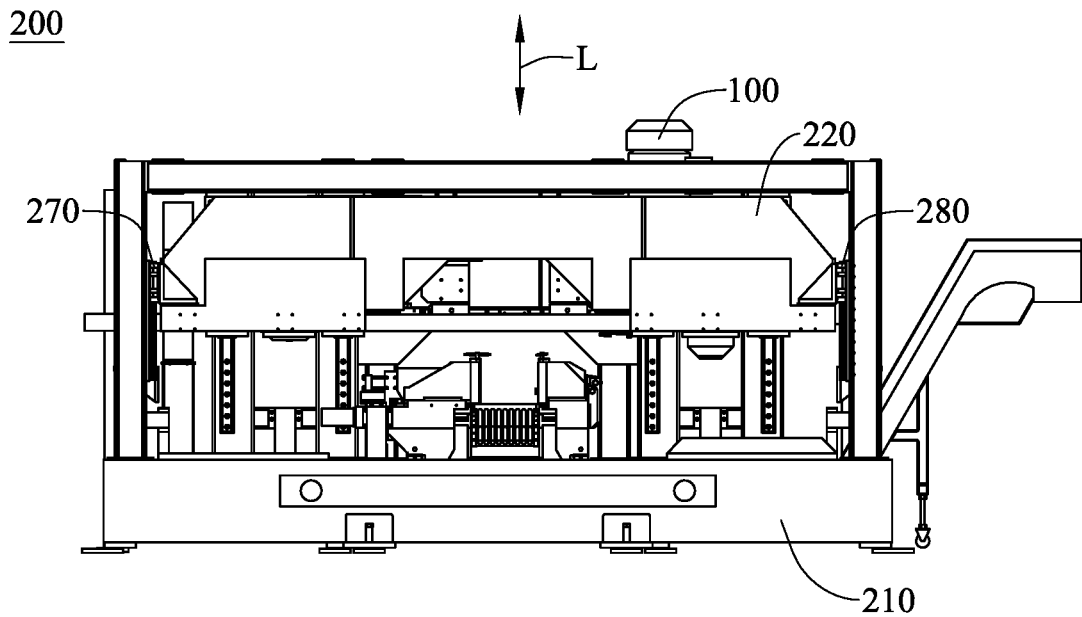
FIG. 4 is a front view showing a band-sawing check valve device of the present invention that is mounted on a platform.
Figure 5:
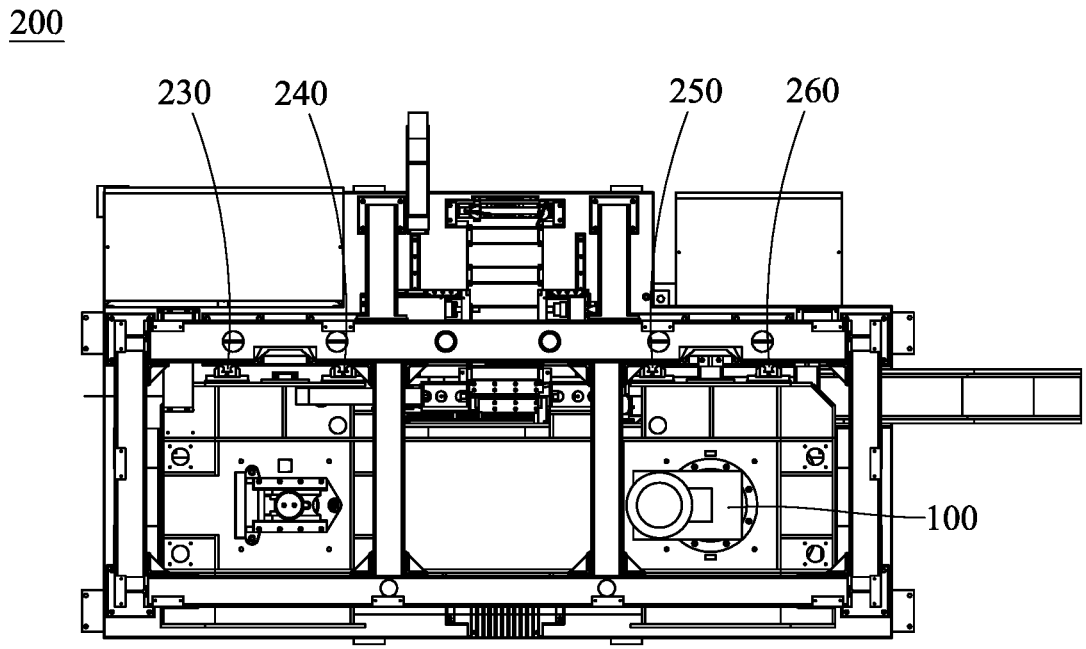
FIG. 5 is a top view showing a band-sawing check valve device of the present invention that is mounted on a platform.

As an embodiment shown in FIG. 4 and FIG. 5, a platform 200 that is disclosed is composed of a base 210, a band-sawing check valve device 100 and a plurality of sliding parts. The band-sawing check valve device 100 can be the band-sawing check valve device shown in FIG. 1 to FIG. 3, whereas the reducer flange 30 in the band-sawing check valve device 100 is fixed to the saw bow 220 while the saw bow 220 is fixed to the plural sliding parts. It is noted that each sliding part can be composed of sliding rails and sliding blocks, but can also be any component of linear transmission ability.

In this embodiment, there are six sliding parts, which are the first sliding part 230, the second sliding part 240, the third sliding part 250, the fourth sliding part 260, the fifth sliding part 270 and the sixth sliding part 280. Moreover, the first sliding part 230, the second sliding part 240, the third sliding part 250, the fourth sliding part 260, the fifth sliding part 270 and the sixth sliding part 280 are being disposed respectively at different positions on the base 210, whereas the fifth sliding part 270 and the six sliding part 280 are located at the front of the platform 200, the first sliding part 230, the second sliding part 240, the third sliding part 250 and the fourth sliding part 260 are located respectively at the rear of the platform 200. However, the amount and the position of the sliding parts are not restricted thereby and thus can be adjusted and changed according to the actual platform that is to be used. It is noted that the first sliding part 230, the second sliding part 240, the third sliding part 250, the fourth sliding part 260, the fifth sliding part 270 and the sixth sliding part 280 are connected respectively to the saw bow 220.

Using the aforesaid configuration, the rotating main wheel 10 is able to drive the saw blade to move revolving inside the saw bow 220, and further by the guiding of the first sliding part 230, the second sliding part 240, the third sliding part 250, the fourth sliding part 260, the fifth sliding part 270 and the sixth sliding part 280, the saw bow 220 is able to move stably in a desired feeding direction L so as to cut a work piece. Similarly, during the process when the main wheel 10 is being driven to rotate, the check valve bearing 61 is functioned to restrict the main wheel 10 to rotate in one direction only for preventing the flywheel effect from being induced, and thus the check valve bearing 61 can restrict the main wheel 10 to rotate in one direction only so as to prevent the main wheel 10 from rotating in an undesired reverse direction, and thus a power cutting operation can be achieved.

To sum up, the present invention provides a band-sawing check valve device with a check valve assembly that is designed to be mounted on a transmission shaft for restricting the main wheel to rotate in one direction only so as to prevent the main wheel from rotating in an undesired reverse direction, and thus by the use of the bandsawing check valve device of the present invention, a power cutting operation can be achieved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A band-sawing check valve device, comprising:
   a main wheel connected to and driving a band saw blade to cut;
   a transmission assembly connected to a transmission shaft and the main wheel, wherein the transmission shaft causes the main wheel to rotate accordingly;
   a driving assembly, connected to the transmission shaft;
   a reducer flange, disposed for allowing one end thereof to be mounted passing through the main wheel while enabling the transmission shaft to be disposed passing through the reducer flange and the check valve assembly; and
   a check valve assembly having a check valve bearing;
   wherein the transmission shaft is disposed passing through the check valve bearing of the check valve assembly enabling the check valve assembly to restrict the transmission shaft and the main wheel to rotate in only one desired direction as the transmission shaft is driven to rotate by the driving assembly.

2. The band-sawing check valve device of claim 1, wherein the check valve bearing is a bearing selected from the group consisting of: a roller bearing, a sprag bearing, and a cam bearing.

3. The band-sawing check valve device of claim 2, wherein the check valve assembly further comprises: a bearing washer, disposed on the check valve bearing.

4. The band-sawing check valve device of claim 1, further comprising:
   a first bearing, arranged for allowing the transmission shaft to be disposed passing therethrough.

5. The band-sawing check valve device of claim 1, further comprising: a second bearing and a third bearing, disposed respectively on opposite sides of the check valve assembly.

6. The band-sawing check valve device of claim 1, wherein the driving assembly further comprises:
   a reducer having an output shaft disposed passing through the transmission shaft; and
   a motor coupled to the reducer.

7. The band-sawing check valve device of claim 1, wherein the transmission assembly further comprises:
   a transmission disc, connected to the transmission shaft for bringing along the main wheel to rotate;
   a leak-proof seal, fixedly attached to the transmission disc.

8. The band-sawing check valve device of claim 1, wherein the reducer flange is fixedly attached to a saw bow.

9. The band-sawing check valve device of claim 1, wherein the saw bow is connected to a plurality of sliding parts.

\* \* \* \* \*